United States Patent [19]

Furukawa et al.

[11] Patent Number: 5,713,437
[45] Date of Patent: Feb. 3, 1998

[54] BRAKE CYLINDER HAVING EFFICIENT AIR BLEEDING

[75] Inventors: Masaaki Furukawa; Hisanori Fujii, both of Nagoya, Japan

[73] Assignee: Nisshinbo Industries Inc., Tokyo, Japan

[21] Appl. No.: 376,552

[22] Filed: Jan. 20, 1995

[30] Foreign Application Priority Data

Jan. 21, 1994 [JP] Japan ................... 6-021959

[51] Int. Cl.$^6$ ................................... B60T 11/00
[52] U.S. Cl. ........................... 188/352; 188/364
[58] Field of Search ........................ 188/352, 364, 188/326, 79.62; 60/453, 584

[56] References Cited

U.S. PATENT DOCUMENTS

| | | | |
|---|---|---|---|
| 2,158,700 | 5/1939 | Hoyt | 188/364 |
| 2,209,343 | 7/1940 | Masteller | 188/364 |
| 2,296,008 | 10/1942 | Goepfrich | 92/75 |
| 2,329,095 | 9/1943 | White | 188/326 |
| 3,765,518 | 10/1973 | Martin | 188/352 |

FOREIGN PATENT DOCUMENTS

| | | |
|---|---|---|
| 0 092 469 | 10/1983 | European Pat. Off. |
| 0092469 | 4/1982 | France |
| 713 937 | 10/1938 | Germany |

*Primary Examiner*—Robert J. Oberleitner
*Assistant Examiner*—C. T. Bartz
*Attorney, Agent, or Firm*—Nikaido, Marmelstein, Murray & Oram LLP

[57] ABSTRACT

A device and method to improve the bleeding of air from a brake cylinder usable in a drum brake. A first cylinder cavity 3 and a second cylinder cavity 4 are bored in the upper and lower sections respectively of the cylinder body 2, and a first piston 31 and a second piston 41 are housed to stroke within said cylinder cavity 3 and cylinder cavity 4 respectively, wherein piston 31 and a partition 21, separating said cylinder cavity 3 and cylinder cavity 4, form a first fluid chamber 32, and piston 41 and said partition 21 form a second fluid chamber 42. The cylinder also comprises at least one grooved fluid line 52 or an interior fluid line 53 to enable passage between said fluid chambers 32, 42; a brake fluid inlet line 51 that brings brake fluid into the second fluid chamber 42; and a brake fluid outlet line 54 that discharges the brake fluid into the first fluid chamber 32. Since the brake fluid inlet line is connected to the lower fluid chamber 2 and the outlet line is connected to the upper fluid chamber 1, brake fluid within the cylinder circulates from the bottom to the top, which makes effective use of the property of air to rise. This motion facilitates an easy and complete exhaustion of the air.

2 Claims, 5 Drawing Sheets

BRAKE CYLINDER HAVING EFFICIENT AIR BLEEDING

BACKGROUND TO THE INVENTION

This invention relates to a brake cylinder.

As shown in FIG. 4 (a cross-section diagram of the configuration of FIG. 5 as cut through a line from Points IV—IV) and FIG. 5, a conventional drum brake cylinder 11' is mounted by mounting holes 22' onto the back plate of the drum brake, such that a first piston 31' and first fluid chamber 32' are on an upper side, and a second piston 41' and second fluid chamber 42' are on a lower side. The brake fluid inlet line 51' and outlet line 54' are both connected to the upper first fluid chamber 32'. A partition 21' is used as a divider such that a second fluid chamber 42' is positioned on the lower side. Accordingly, as air is bled from the cylinder 11', the brake fluid introduced from inlet line 51' expands in the upper first fluid chamber, and a portion of the fluid flows into the lower fluid chamber 42' through the gap around partition 21', and air becomes mixed with the brake fluid inside the first and second fluid chambers and elsewhere. The brake fluid containing this air is discharged from the upper first fluid chamber 32' via the outlet line 54'. To bleed the air, the air bleeder 5' is loosened, and the brake fluid mixed with air is discharged.

The conventional method to bleed air from a brake cylinder has the following problems.

(1) Although brake fluid does flow into the lower second fluid chamber 42', since the latter is separated from the upper fluid chamber 32' by the partition 21', the flow of brake fluid is much slower. This delayed flow of brake fluid into the corners causes pockets of residual air to form, making it difficult for air to be adequately exhausted.

(2) The brake fluid inlet line 51' and outlet line 54' both use the upper first fluid chamber 32', in which case brake fluid cannot circulate adequately. In the lower second fluid chamber 42', the reciprocating motion of a portion of the fluid causes air to be trapped, and again the air cannot be bled sufficiently.

SUMMARY OF THE INVENTION

This invention provides a brake cylinder and an efficient method for bleeding air from a brake cylinder.

This invention is a novel brake comprised of a cylinder body with a first cylinder cavity set in the upper segment and a second cylinder cavity set in the lower segment of the cylinder body, in which the first piston and second piston are housed to stroke within the first cylinder cavity and second cylinder cavity respectively; a partition that separates the first cylinder cavity from the second cylinder cavity, wherein said first piston and said partition form a first fluid chamber, and said second piston and said partition form a second fluid chamber; a fluid line with passage between the first fluid chamber and second fluid chamber; and a brake fluid inlet line that brings brake fluid into the lower second fluid chamber, and a brake fluid outlet line that discharges brake fluid from the upper first fluid chamber.

Further, this invention is a novel brake comprised of a cylinder body with a first cylinder cavity set in the upper segment and a second cylinder cavity set in the lower segment of the cavity body, in which the first piston and second piston are housed to stroke within the first cylinder cavity and second cylinder cavity respectively; a partition that separates the first cylinder cavity and the second cylinder cavity, wherein said first piston and said partition form a first fluid chamber, and said second piston and said partition form a second fluid chamber; an automatic brake clearance adjustment device that penetrates through the partition and has a fluid line with a passage inside said first fluid chamber and the second fluid chamber; and a brake fluid inlet line that brings brake fluid into the lower second fluid chamber, and a brake fluid outlet line that discharges brake fluid from the upper first fluid chamber.

Moreover, this invention is a novel air bleeding method with either of the brake cylinders described above, wherein brake fluid is injected into the brake fluid inlet line, then flows, in order, through said second brake fluid chamber, said fluid line, first brake fluid chamber, and said brake fluid outlet line, to exhaust the air contained in the brake fluid therein from the brake cylinder.

Since the brake fluid inlet line is connected to the lower second fluid chamber and the outlet line is connected to the upper first fluid chamber, brake fluid within the cylinder circulates from the bottom to the top, which makes effective use of the property of air to rise. This motion facilitates an easy and complete exhaustion of the air.

DETAILED DESCRIPTION OF THE DRAWINGS AND PREFERRED EMBODIMENT

Figure 2:
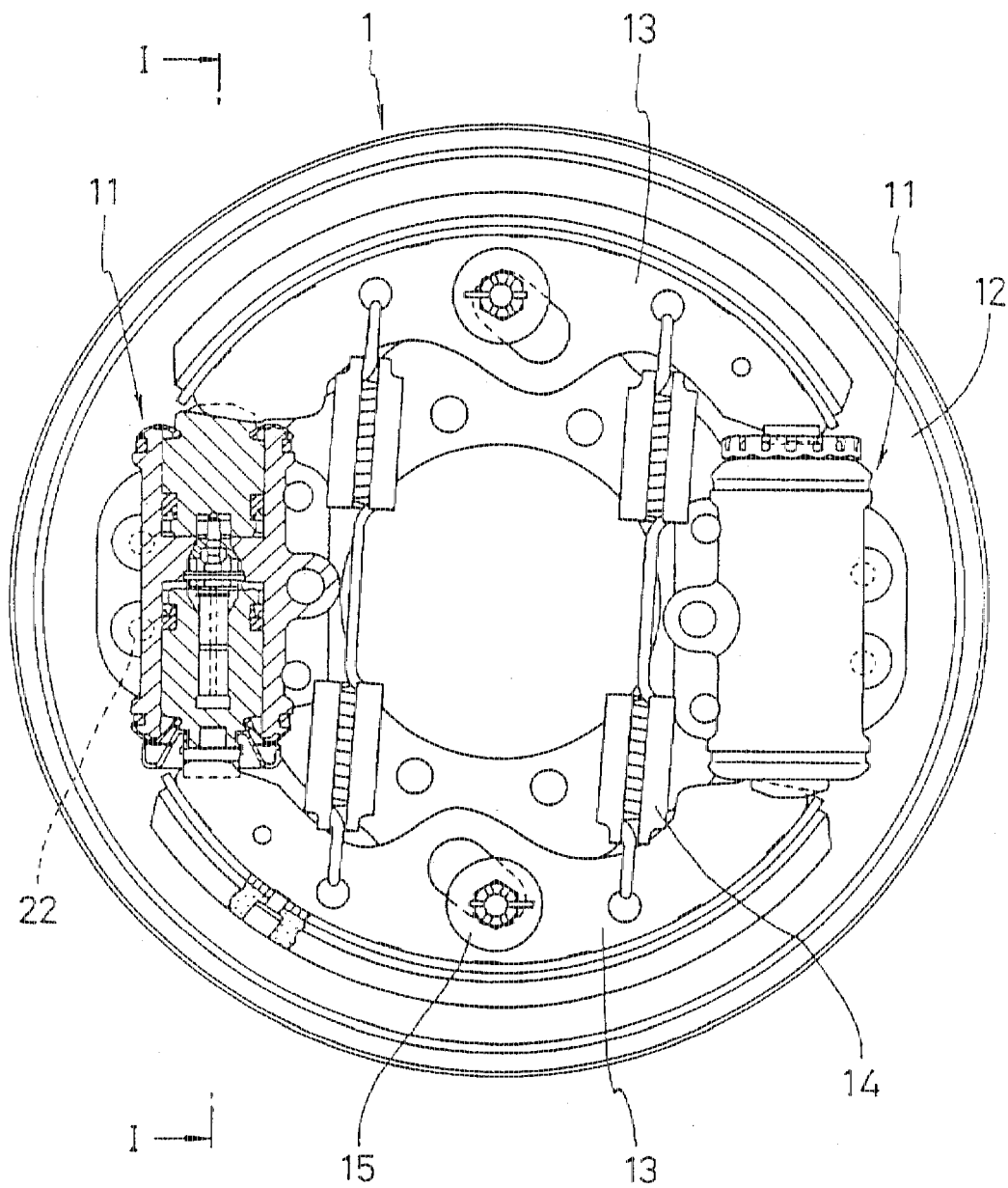
FIG. 2 is a diagram of a dual-two-leading shoe type of drum brake.

The above and other objects and the attendant advantages of the present invention will become readily apparent by reference to the following detailed description when considered in conjunction with the accompanying drawings wherein:

As shown in FIG. 2, the brake cylinder 11 as embodied in this example, is applicable to a dual-two-leading shoe type drum brake. This drum brake 1 is affixed to the vehicle body by means of the back plate 12, and is comprised of the pair of brake shoes 13, secured to the back plate 12 by means of the shoe anchors 15 and mounted to be movable between the pair of left and right brake cylinders 11; and the return spring 14, tensioned between the brake shoes 13, that applies a contraction force to the brake shoes.

Figure 1:
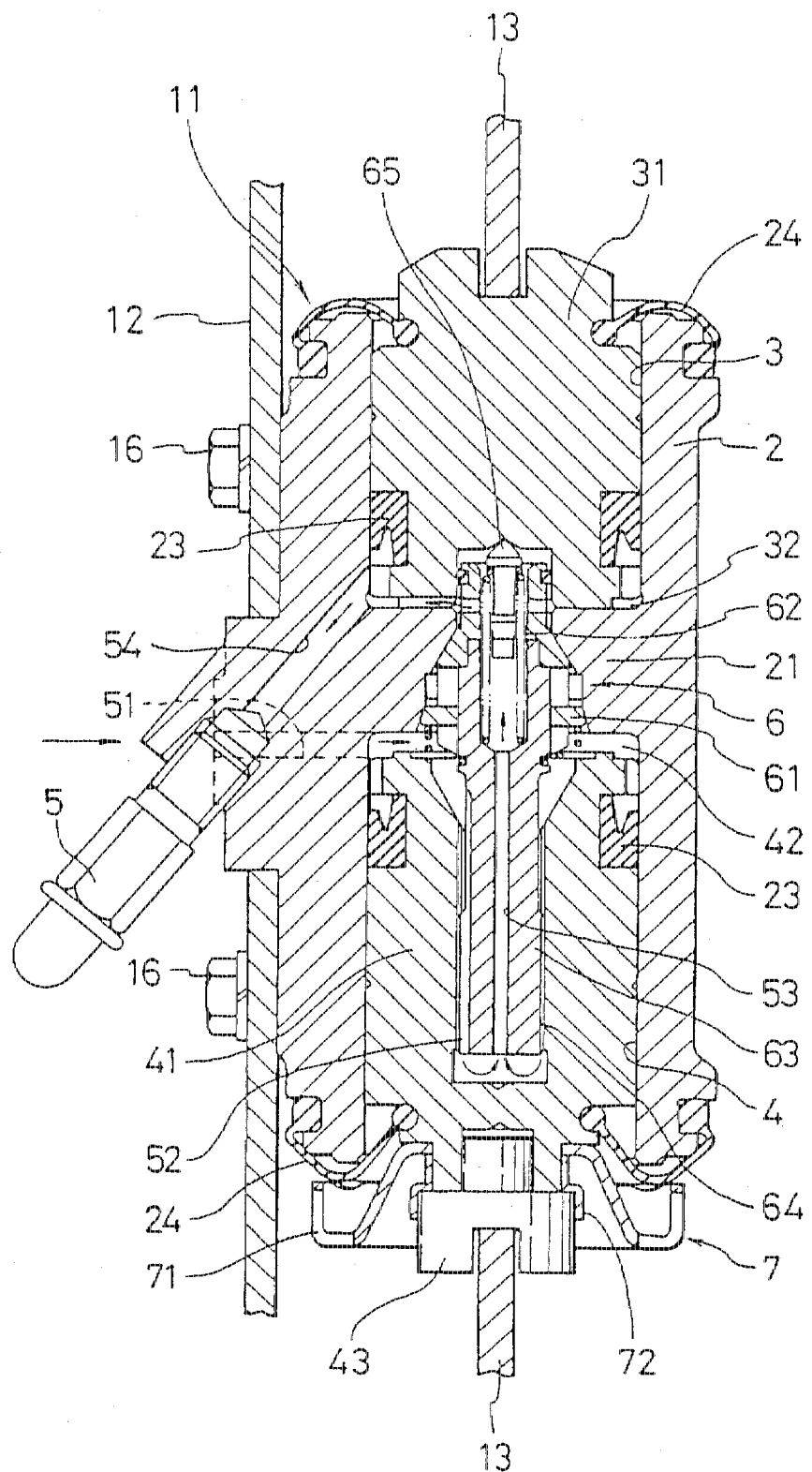
FIG. 1 is a cross section diagram of one embodiment of the brake cylinder of this invention.

As shown in the detailed diagram of FIG. 1 (a cross-section diagram as viewed from a line through Points 1—1 of the brake cylinder 11 shown in FIG. 2), each brake cylinder 11 is affixed to the back plate 12 by the mounting bolt 16 bolted into the mounting hole 22. The brake cylinder is comprised of two cavities, an upper first cylinder cavity 3 and a lower second cylinder cavity 4, bored in the upper and lower sections respectively of the cylinder body 2; two pistons, an upper first piston 31 and a lower second piston 41 housed to stroke within the upper and lower cylinder cavities respectively; and two fluid chambers, an upper first fluid chamber 32 and a lower second fluid chamber 42, formed by each said piston and a partition 21 that separates the two cylinder cavities.

The partition 21 is formed between and separates the upper first cylinder cavity 3 and the lower second cylinder cavity 4, bored inside the cylinder body 2. A piston cup 23 is fitted around the perimeter of first piston 31, to form the fluid-tight first fluid chamber 32 as the piston strokes within the upper first cylinder cavity 3. Similarly, a piston cup 23 is fitted around the perimeter of the second piston 41, to form the fluid-tight second fluid chamber 42 as the piston strokes within the lower second cylinder cavity 4. A boot 24 blocks each boundary between the cylinder body 2 and each piston 31, 41, and prevents dirt and other particles from penetrating into the brake cylinder 11.

An automatic brake clearance adjustment device 6, comprised of an adjustment shaft 63, a drive ring 61, a locator 65, and other components, is incorporated between the first piston 31 and second piston 41. This device automatically compensates for the gap, formed between the brake shoe 13 and the brake drum, (not shown in the diagram) that naturally accompanies wear in the brake shoe 13. The adjustment shaft 63 is screwed into the thread shell 64 molded at the shaft center of the second piston 41, and one or more grooved fluid lines 52 are molded on the screw 64 in the axial direction. The grooved fluid line(s) can be molded on either the adjustment shaft 63, second piston 41, or both thereof. Another interior fluid line 53 is bored in the axial direction inside the adjustment shaft 63; and a locator 65 which is a threaded member energized by a spring 62 towards the first piston 31, is housed in the opening at its upper tip. Together, the grooved fluid line 52 and the interior fluid line 53 enable brake fluid to flow from the lower second fluid chamber 42 to the upper first fluid chamber 32.

An adjustment ring 7, on which are molded manual adjustment teeth 71, is integrally attached by a clip 72 to the second piston 41. Clip 72 is mounted so, that the piston head 43, interlocked to the brake shoe 13 by a groove at the tip, and the second piston 41, are mutually rotatable. The second piston 41 can be projected out from the cylinder body 2, or reversed as necessary by manually rotating the manual adjustment teeth 71, in order to adjust the clearance of the brakes. However, in this invention, this automatic adjustment device 6 is not always required, and a fluid line molded so as to enable brake fluid to flow from the second fluid chamber 42 to the first fluid chamber 32 will suffice.

The brake fluid inlet line 51 is molded to the cylinder body 2, and connected to the second fluid chamber 42 from the exterior of the brake cylinder 11, which brings brake fluid into the fluid chamber. Meanwhile, the brake fluid outlet line 54 discharges brake fluid from the first fluid chamber 32 outside of the brake cylinder. An air bleeder 5, screwed to the outlet port, seals off discharge of the brake fluid. Or, instead of an air bleeder 5, the inlet port of another cylinder can be connected with a tube to the outlet port to connect the cylinders in series.

To bleed air from the brake cylinder 11, brake fluid is injected from the inlet line 51, and the air bleeder 5 is loosened. The brake fluid passes through the inlet line 51 and expands and disperses inside the lower second fluid chamber 42, then passes through the grooved fluid line 52 on the thread shell 64 between the second piston 41 and the adjustment shaft 63, and then flows into the upper first fluid chamber 32 via the interior fluid line 53 inside the adjustment shaft 63. During these processes, air contained in the brake fluid is transmitted with the brake fluid to the upper first fluid chamber 32. Finally, the brake fluid containing air is discharged from the first fluid chamber 32 to the brake fluid outlet line 54. Air has the property of rising; therefore, air trapped in the brake fluid can be efficiently removed by a repeated transfer of the brake fluid from the lower chamber to the upper chamber.

Figure 3:
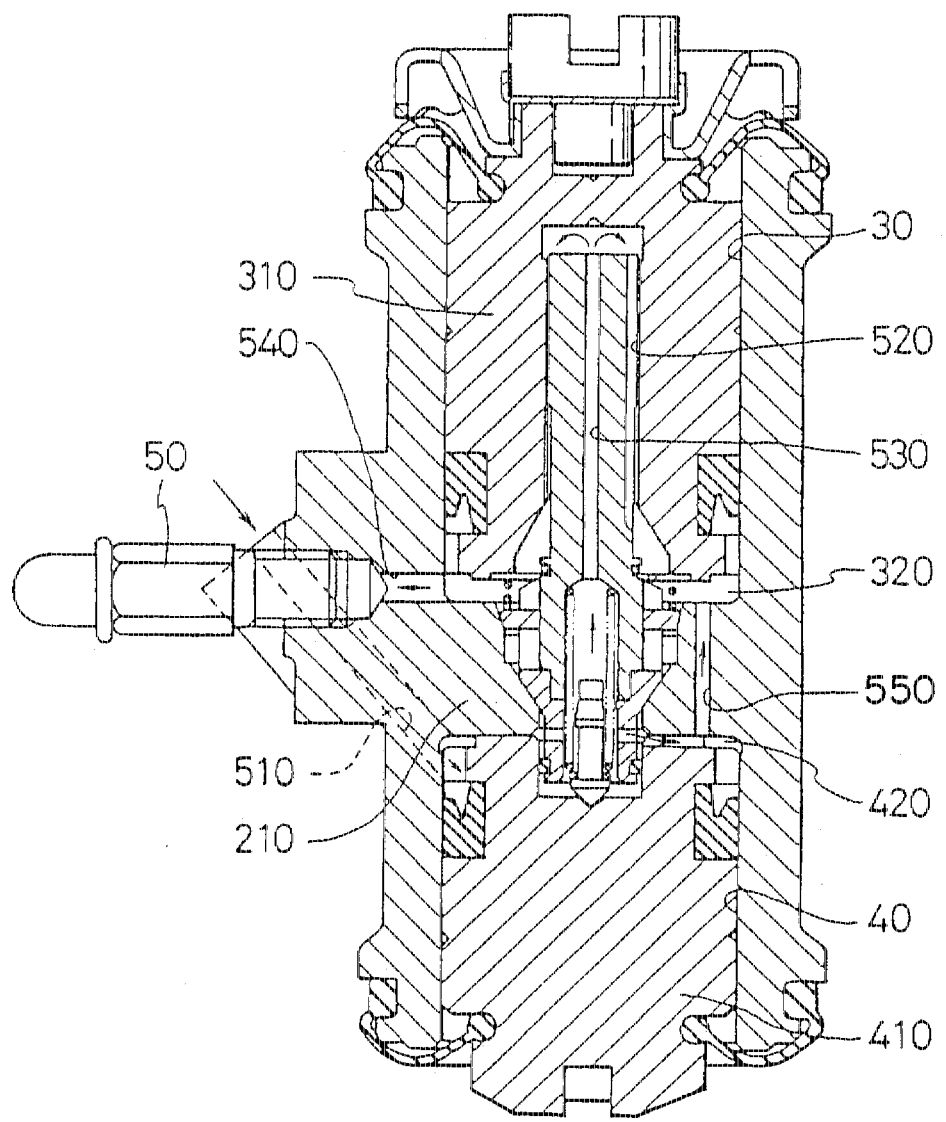
FIG. 3 is a cross section diagram of another embodiment of the brake cylinder of this invention.
Figure 4:
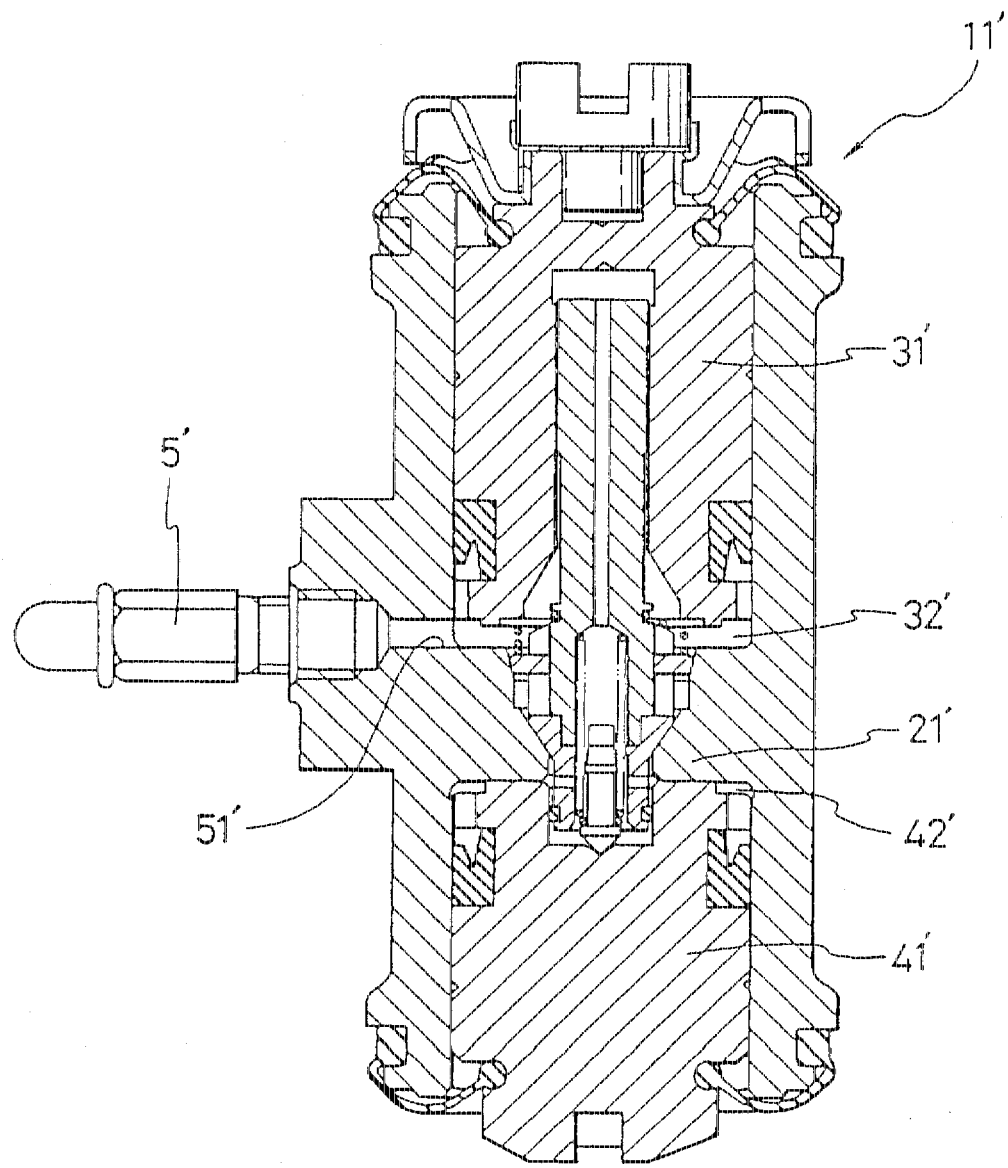
FIG. 4 is a cross section diagram of a conventional brake cylinder.
Figure 5:
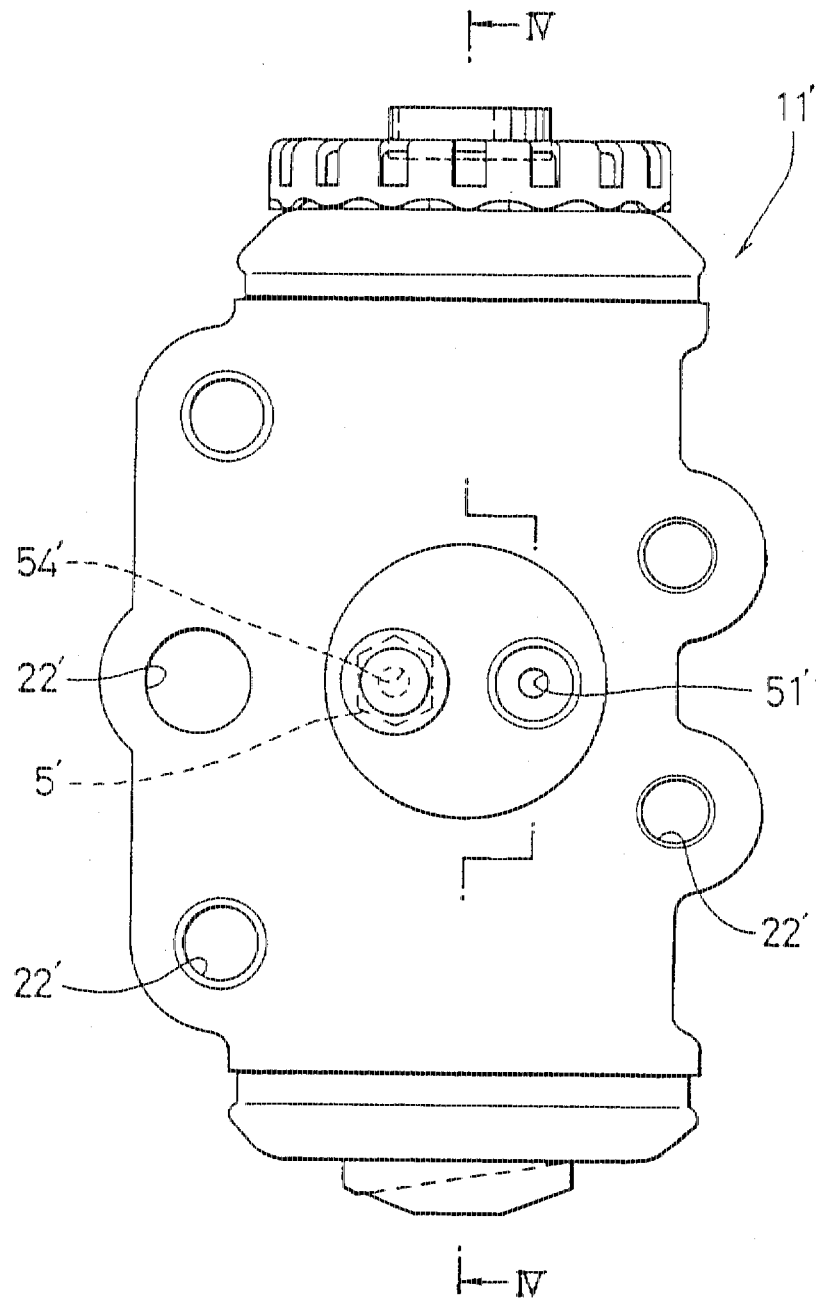
FIG. 5 is a planar diagram of a conventional brake cylinder.

In another example of an embodiment of this invention as shown in FIG. 3, the upper and lower brake cylinders as configured in FIG. 1 are reversed to switch positions of the inlet line 510 and outlet line 540. Also, a cavity, bored inside partition 210 to form a passage between the first fluid chamber 320 and the second fluid chamber 420, functions as a partition fluid line 550 to facilitate flow of the brake fluid. To bleed air with this configuration, brake fluid is injected into the second fluid chamber 420 via brake fluid inlet line 510. Next, brake fluid flows into the first fluid chamber 320 by means of two fluid lines; a line formed by the interior fluid line 530 and the grooved fluid line 520, and the partition fluid line 550. Using these lines in the manner described, brake fluid containing air is discharged outside of the brake cylinder via the brake fluid outlet line 540.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A brake cylinder connectable to a source of brake fluid comprising:

a cylinder body with a first cylinder cavity set in an upper segment and a second cylinder cavity set in a lower segment of the cavity body;

a first piston and a second piston housed to stroke within the first cylinder cavity and second cylinder cavity, respectively;

a partition that separates the first cylinder cavity from the second cylinder cavity, wherein the first piston and the partition form an upper first fluid chamber, and the second piston and the partition form a lower second fluid chamber;

a fluid line with passage between the first fluid chamber and the second fluid chamber; and a brake fluid inlet line for transferring brake fluid from the source of brake fluid into the lower second fluid chamber, and a brake fluid outlet line that discharges brake fluid from the upper first fluid chamber to the source of brake fluid.

2. A brake cylinder connectable to a source of brake fluid comprising:

a cylinder body with a first cylinder cavity set in an upper segment and a second cylinder cavity set in a lower segment of the cavity body;

a first piston and second piston housed to stroke within the first cylinder cavity and second cylinder cavity respectively;

a partition that separates the first cylinder cavity and the second cylinder cavity, wherein the first piston and the partition form a first fluid chamber, and the second piston and the partition form a second fluid chamber;

an automatic brake clearance adjustment device that penetrates through the partition and has a fluid line with a passage connecting the first fluid chamber and the second fluid chamber; and a brake fluid inlet line that brings brake fluid from the source of brake fluid into the second fluid chamber, and a brake fluid outlet line that discharges brake fluid from the first fluid chamber to the source of brake fluid.

\* \* \* \* \*